US009663093B2

(12) United States Patent
Kaneko

(10) Patent No.: US 9,663,093 B2
(45) Date of Patent: May 30, 2017

(54) CLUTCH DISENGAGEMENT CONTROL MECHANISM FOR MECHANICAL AUTOMATIC TRANSMISSION

(75) Inventor: Kunihiro Kaneko, Saitama (JP)

(73) Assignee: UD TRUCKS CORPORATION, Ageo-shi (JP)

( * ) Notice: Subject to any disclaimer, the term of this patent is extended or adjusted under 35 U.S.C. 154(b) by 165 days.

(21) Appl. No.: 13/885,477

(22) PCT Filed: Nov. 14, 2011

(86) PCT No.: PCT/JP2011/076137
§ 371 (c)(1),
(2), (4) Date: May 15, 2013

(87) PCT Pub. No.: WO2012/070413
PCT Pub. Date: May 31, 2012

(65) Prior Publication Data
US 2013/0237373 A1    Sep. 12, 2013

(30) Foreign Application Priority Data
Nov. 24, 2010 (JP) .................. 2010-260971

(51) Int. Cl.
*B60W 10/02* (2006.01)
*B60T 8/32* (2006.01)
(Continued)

(52) U.S. Cl.
CPC ........... *B60W 10/02* (2013.01); *B60T 8/3215* (2013.01); *B60W 10/184* (2013.01); *F16D 48/06* (2013.01);
(Continued)

(58) Field of Classification Search
CPC ........................... F16D 2500/50816
See application file for complete search history.

(56) References Cited

U.S. PATENT DOCUMENTS 4,730,709 A * 3/1988 Kawata et al. ............... 192/3.31
4,732,248 A * 3/1988 Yoshimura et al. .......... 477/171
(Continued)

FOREIGN PATENT DOCUMENTS

EP   0312351   * 4/1989
JP   60-008553   1/1985
(Continued)

OTHER PUBLICATIONS

International Search Report for International Application No. PCT/JP2011/076137 dated Feb. 7, 2012.

*Primary Examiner* — Mark Manley
(74) *Attorney, Agent, or Firm* — Kratz, Quintos & Hanson, LLP

(57) ABSTRACT

The objective of the present invention is to provide a clutch disengagement control mechanism that is for a mechanical automatic transmission and that can perform clutch disengagement control at an optimal timing during both ordinary driving and low-speed driving at the verge of stopping. To this end, the present invention is provided with a vehicle speed measurement device (3 and 6, or 4), a brake-operation-speed measurement device (8), a clutch operation device (9), and a control device (10). The control device (10) has: a function for generating a control signal that disengages the clutch from the clutch operation device (9) when the brake operation speed is at least a second threshold (B) in the case that the vehicle speed (X) is at least a first threshold (A); and a function for generating a control signal that disengages the clutch from the clutch operation device (9) when the brake operation speed is at least a third threshold (C) in the case that the vehicle speed (X) is less than the first threshold (A).

4 Claims, 4 Drawing Sheets

(51) Int. Cl.
*B60W 10/184* (2012.01)
*F16D 48/06* (2006.01)

(52) U.S. Cl.
CPC ....... *B60T 2201/03* (2013.01); *B60T 2260/04* (2013.01); *F16D 2500/3108* (2013.01); *F16D 2500/31426* (2013.01); *F16D 2500/50816* (2013.01); *F16D 2500/70424* (2013.01); *Y10T 477/745* (2015.01)

(56) References Cited

U.S. PATENT DOCUMENTS

| | | | | |
|---|---|---|---|---|
| 6,074,326 | A | * | 6/2000 | Sakakibara ........... F16H 61/143 192/3.31 |
| 2004/0117097 | A1 | * | 6/2004 | Tanaka ................... F16H 59/48 701/70 |
| 2004/0237510 | A1 | * | 12/2004 | Kusada et al. .................. 60/285 |
| 2008/0269013 | A1 | * | 10/2008 | Minaki et al. .................. 477/86 |

FOREIGN PATENT DOCUMENTS

| | | |
|---|---|---|
| JP | 61-285143 | 12/1986 |
| JP | 61-285144 | 12/1986 |
| JP | H03-36554 | 4/1991 |
| JP | H3-200431 | 9/1991 |
| JP | 06-247170 | 9/1994 |
| JP | H7-197951 | 8/1995 |
| JP | H9-42443 | 2/1997 |
| JP | H9-79374 | 3/1997 |
| JP | 09-324827 | 12/1997 |
| JP | H9-324826 | 12/1997 |
| JP | 11-241737 | 9/1999 |
| JP | 2009-522521 A | 6/2009 |
| WO | 2007/078224 A1 | 7/2007 |

* cited by examiner

CLUTCH DISENGAGEMENT CONTROL MECHANISM FOR MECHANICAL AUTOMATIC TRANSMISSION

TECHNICAL FIELD

The present invention relates to mechanical automatic transmissions, more particularly, to control of disengaging clutch used in a mechanical automatic transmission, that is, clutch disengagement control technique.

BACKGROUND ART

It is well known control mechanism that disengages a clutch by determining that "panic braking" is performed if the operation speed of a brake pedal exceeds a predetermined value when a vehicle is running. A problem of such control is that, when the predetermined value is set low, the clutch is disengaged frequently while the vehicle is running and the vehicle runs at idle for a moment.

To overcome such a problem, the predetermined value may be set high. However, setting the predetermined value high tends to slow the speed at which the brake is stepped on when the vehicle speed is slow as in a traffic congestion, which creates a situation in which the clutch cannot be disengaged even when the brake is stepped on to disengage the clutch.

Specifically, even when the brake pedal is stepped on when the vehicle is running at low speed just before the vehicle is stopped, clutch disengagement timing is delayed, and a feeling that the vehicle is pushed out, a shock to the human body, and the like make a driver uneasy.

As another prior art, a clutch control device that automatically "disengages" a clutch in response to brake operation is disclosed (refer to Patent Literature 1).

However, Patent Literature 1 is configured such that, in a case where the vehicle speed is less than or equal to a predetermined vehicle speed and the engine speed is less than or equal to a predetermined engine speed while a vehicle is running, when it is recognized that a brake is operated, a clutch actuator is operated to disengage the clutch and, when the vehicle is stopped, a transmission gear is shifted to neutral position and the "disengagement" operation of the clutch actuator is stopped to engage the clutch, and does not solve the above-described problem.

CITATION LIST

Patent Literature

Patent Literature 1: Japanese Patent Application Non-examined Publication Gazette No. H9-42443 (JPA H9-42443)

SUMMARY OF INVENTION

Technical Problem

The present invention has been proposed in view of the above-described problem of the prior arts, and an object thereof is to provide a clutch disengagement control mechanism for a mechanical automatic transmission, said clutch disengagement control mechanism being performed clutch disengagement control operation with an optimal timing during both ordinary driving and low-speed driving just before a vehicle is stopped.

Solution to Problem

A clutch disengagement mechanism for a mechanical automatic transmission of the present invention is characterized in that the clutch disengagement mechanism includes: a vehicle speed measurement device (an engine rotation sensor 3 and a gear position sensor 6 or a vehicle speed sensor 4) that measures a vehicle speed (X); a brake-operation-speed measurement device that measures a brake operation speed; a clutch operation device (9) that perform a clutch disengagement operation; and a control device (10), the control device (10) has the function of, when the vehicle speed (X) is more than or equal to a first threshold (A), issuing, to the clutch operation device (9), a control signal that disengages a clutch when the braking rate of deceleration is more than or equal to a second threshold (B: for example, the rate of deceleration 30%/sec) and has the function of, when the vehicle speed (X) is less than the first threshold (A), issuing, to the clutch operation device (9), a control signal that disengages the clutch when the braking rate of deceleration is more than or equal to a third threshold (C: for example, the rate of deceleration 10%/sec), and the second threshold (B) of the brake operation speed is a value more than the third threshold (C) (the rate of deceleration 30%/sec>the rate of deceleration 10%/sec).

In the present invention, it is preferable that the vehicle speed measurement device includes an engine-speed measurement device (3) that detects an engine speed of the vehicle, a gear position measurement device (6) that detects a gear position in a transmission, and the control device (10) and the control device (10) has the function of determining the vehicle speed based on the gear position in the transmission, the gear position detected by the gear position measurement device (6), and the engine speed of the vehicle, the engine speed detected by the engine-speed measurement device (3).

In that case, it is preferable that the brake-operation-speed measurement device includes a brake signal measurement device (7) that detects the presence or absence of a brake signal, the control device (10), and a timer device (a timer 12) provided therein and the control device (10) has the function of determining the brake operation speed (that is, the rate of decrease in vehicle speed) based on the vehicle speed determined by the control device (10) and the length of time (measured by the timer 12) that has elapsed since the detection of the brake signal by the brake signal measurement device.

Alternatively, it is preferable that the vehicle speed measurement device is formed of a vehicle speed sensor (4), the brake-operation-speed measurement device includes a brake signal measurement device (7) that detects the presence or absence of a brake signal, the control device (10), and a timer device (a timer 12) provided therein, and the control device (10) has the function of determining the brake operation speed (that is, the rate of decrease in vehicle speed) based on the vehicle speed measured by the vehicle speed sensor (4) and the length of time (measured by the timer 12) that has elapsed since the detection of the brake signal by the brake signal measurement device (7).

Incidentally, in the present invention, it is preferable that the values of the first to third thresholds (A, B, and C) can be set at any values.

Advantageous Effects of Invention

According to the present invention provided with the above-described configuration, as the threshold based on which a control signal that disengages a clutch is issued to the clutch operation device (9), two types of thresholds: the threshold (the second threshold B) in high-speed driving and the threshold (the third threshold C) in low-speed driving are set, and these thresholds (the second threshold B and the third threshold C) are configured so as to be switched based on the vehicle speed.

In addition, during low-speed driving such as driving in a traffic congestion, as the threshold of the brake operation speed based on which a control signal that disengages a clutch is issued to the clutch operation device, the third threshold (C: for example, the rate of deceleration 10%/sec) set at a slow value is used.

Therefore, when the brake operation speed becomes slow in a traffic congestion, for example, a determination that the brake operation speed is less than the threshold is prevented from being made when the brake is operated to stop the vehicle. Thus, the clutch is disengaged reliably, which prevents a so-called "feeling that the vehicle is pushed out" from being produced and prevents a shock caused when the vehicle is stopped in a state in which the clutch is engaged.

On the other hand, during ordinary driving, the second threshold (B: for example, the rate of deceleration 30%/sec), for example, is used, and, by setting the second threshold (B) relatively high, the clutch is prevented from being brought into a "disengagement" state as a result of a determination that the brake operation speed is too high being made.

As a result, the vehicle is reliably prevented from running at idle.

DESCRIPTION OF EMBODIMENTS

Hereinafter, embodiments of the present invention will be described with reference to the attached drawings.

First, a first embodiment will be described based on FIGS. 1 to 4.

Figure 1:
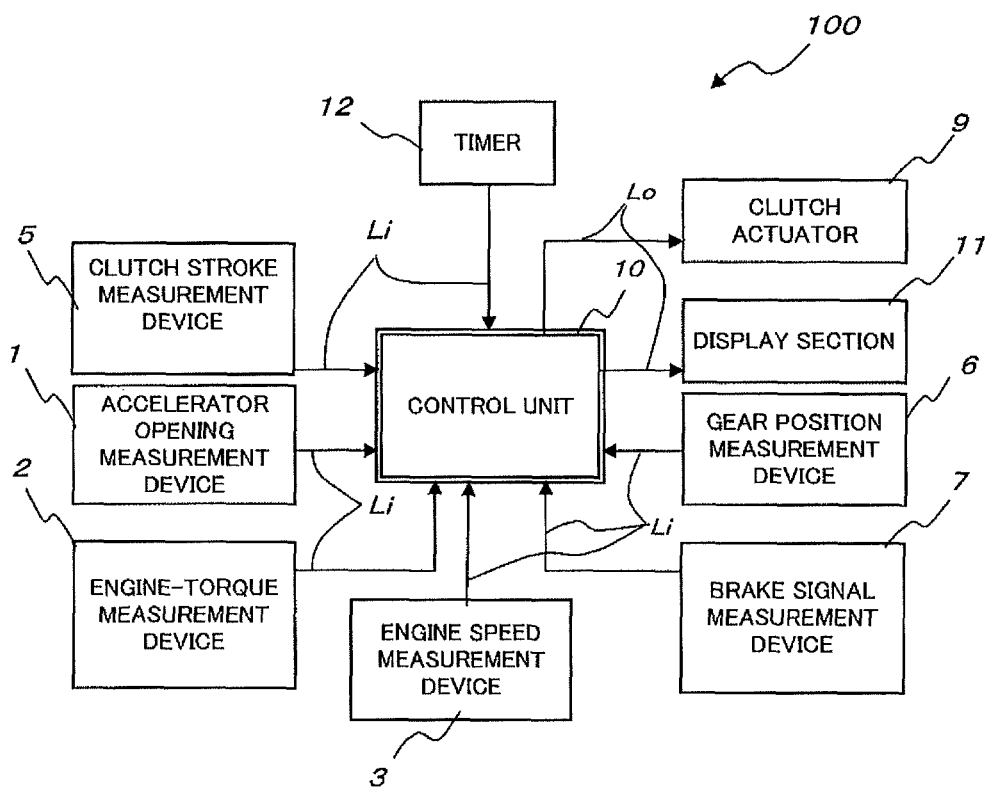
FIG. 1 is a block diagram illustrating the configuration of a control system according to a first embodiment of the present invention.

FIG. 1 illustrates the configuration of a control system of a clutch disengagement mechanism for a mechanical automatic transmission (hereinafter referred to as a "clutch disengagement mechanism") whose whole portion is identified with reference character 100.

In FIG. 1, the clutch disengagement mechanism 100 includes a control unit 10, an accelerator opening measurement device (hereinafter referred to as an "accelerator opening sensor") 1, an engine-torque measurement device (hereinafter referred to as an "engine-torque sensor") 2, an engine-speed measurement device (hereinafter referred to as an "engine rotation sensor") 3, a clutch stroke measurement device (hereinafter referred to as a "clutch stroke sensor") 5, a gear position measurement device (hereinafter referred to as a "gear position sensor") 6, a brake signal measurement device (hereinafter referred to as a "brake sensor") 7, a clutch actuator 9, a display section 11, and a timer 12.

The control unit 10 is connected to the accelerator opening sensor 1, the engine-torque sensor 2, the engine rotation sensor 3, the clutch stroke sensor 5, the gear position sensor 6, the brake sensor 7, and the timer 12 by input signal lines Li.

Moreover, the control unit 10 is connected to the clutch actuator 9 and the display section 11 by control signal lines Lo.

The control unit 10 has the function of, when a vehicle speed (X) is more than or equal to a first threshold (A), issuing, to the clutch actuator 9, a control signal that disengages a clutch when a brake operation speed is more than or equal to a second threshold (B: for example, the rate of deceleration 30%/sec).

Moreover, the control unit 10 has the function of, when the vehicle speed (X) is less than the first threshold (A), issuing, to the clutch actuator 9, a control signal that disengages the clutch when the brake operation speed is more than or equal to a third threshold (C: for example, the rate of deceleration 10%/sec).

Here, the second threshold (B) of the brake operation speed is a value more than the third threshold (C) (the rate of deceleration 30%/sec>the rate of deceleration 10%/sec).

Next, based on a flowchart of FIG. 2, with reference also to FIG. 1, a method for controlling clutch disengagement will be described.

Figure 2:
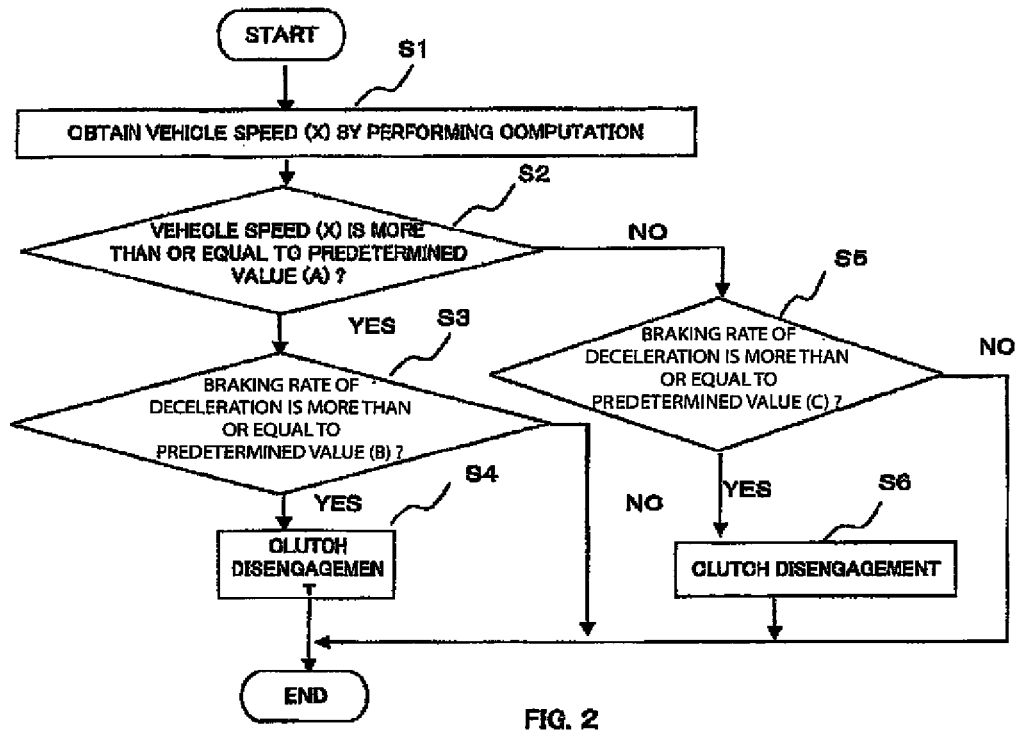
FIG. 2 is a flowchart describing main control of the first embodiment.

In step S1 of FIG. 2, the control unit 10 obtains the vehicle speed by performing a computation.

The computation for obtaining the vehicle speed is performed by a flowchart of FIG. 3, which will be described later.

In step S2, the control unit 10 determines whether or not the vehicle speed X is more than or equal to the predetermined value A by comparing the vehicle speed X obtained by performing a computation with the predetermined value (the predetermined vehicle speed: the first threshold) A stored in an unillustrated database in the control unit 10.

If the vehicle speed X is more than or equal to the predetermined value A (step S1 is YES), the procedure proceeds to step S3; if the vehicle speed X is less than the predetermined value A (step S1 is NO), the procedure proceeds to step S5.

In step S3, the control unit 10 determines whether or not the brake operation speed is more than or equal to the predetermined value B.

If the brake operation speed is more than or equal to the predetermined value (the second threshold) B (step S3 is YES), the control unit 10 disengages the clutch by issuing a control signal to the clutch actuator 9 (clutch disengagement: step S4).

On the other hand, if the brake operation speed is less than the predetermined value (the second threshold) B (step S3 is NO), the control unit 10 ends the control.

In step S5, the control unit 10 determines whether or not the brake operation speed is more than or equal to the predetermined value (the third threshold) C.

As described earlier, the third threshold (C) of the brake operation speed is a value less than the second threshold (B) (the rate of deceleration 30%/sec>the rate of deceleration 10%/sec).

If the brake operation speed is more than or equal to the predetermined value (the third threshold) C (step S5 is YES), the control unit 10 disengages the clutch by issuing a control signal to the clutch actuator 9 (clutch disengagement: step S6).

On the other hand, if the brake operation speed is less than the predetermined value (the third threshold) C (step S3 is NO), the control unit 10 ends the control.

Here, the brake operation speed in step S3 and step S5 is obtained by performing a computation by a flowchart of FIG. 4, which will be described later.

Next, a method for obtaining the vehicle speed by performing a computation will be described based on the flowchart of FIG. 3 with reference also to FIG. 1.

Figure 3:
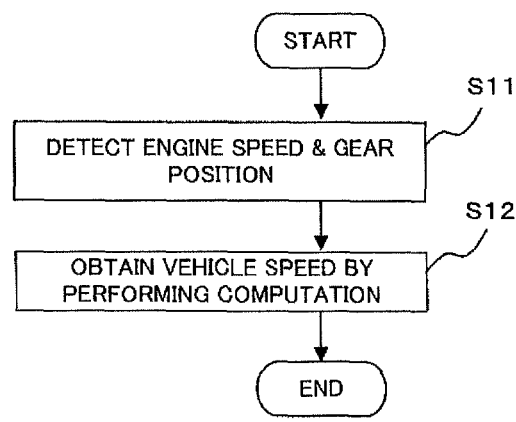
FIG. 3 is a flowchart describing sub control which is performed simultaneously with the main control of the first embodiment.

In step S11 of FIG. 3, the control unit 10 detects the engine speed and the gear position based on the information from the engine rotation sensor 3 and the gear position sensor 6. Then, the control unit 10 obtains the vehicle speed by performing a computation based on the engine speed and the gear position (step S12).

Next, a method for obtaining the brake operation speed will be described based on the flowchart of FIG. 4 with reference also to FIG. 1.

Figure 4:
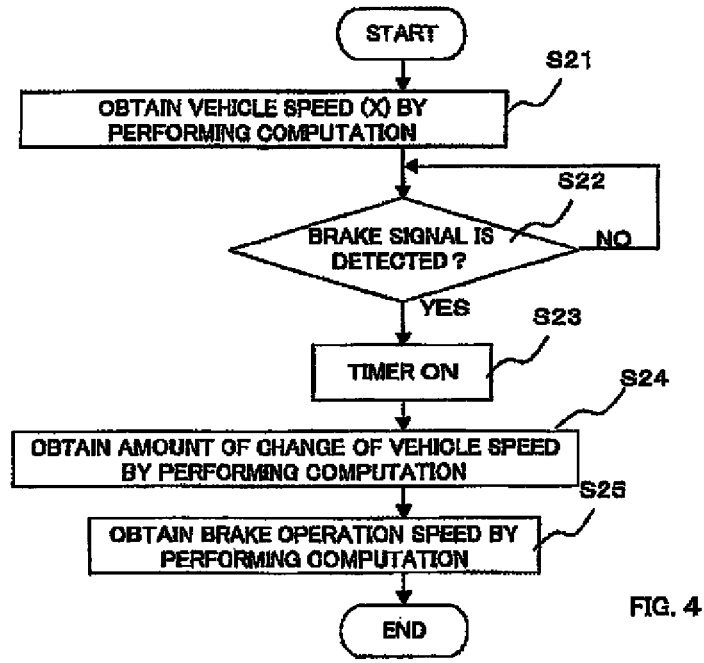
FIG. 4 is a flowchart describing sub control which is different from the control of FIG. 3, the sub control which is performed simultaneously with the main control of the first embodiment.

In step S21 of FIG. 4, the control unit 10 obtains the vehicle speed by performing a computation by the method described by referring to the control flowchart of FIG. 3. In step S22, the control unit 10 waits until a brake signal is detected while monitoring a signal from the brake sensor 7 (a loop created when step S22 is NO), and, when the brake signal is detected (step S22 is YES), the control unit 10 immediately operates the timer (step S23).

In step S24, though not illustrated in FIG. 4, the control unit 10 obtains the amount of change of the vehicle speed by performing a computation based on the vehicle speed obtained when a predetermined time has elapsed from the time when the timer was operated and the vehicle speed obtained in step S21.

In step S25, the control unit 10 obtains the deceleration of the vehicle, that is, the brake operation speed by performing a computation by dividing the amount of change of the vehicle speed obtained in step S24 by the elapsed time (by differentiation).

Incidentally, it is also possible to equip the vehicle with a G sensor that can detect the deceleration of the vehicle in the front-back direction thereof and directly obtain the deceleration of the vehicle (the brake operation speed) by using the G sensor.

According to the first embodiment illustrated in the drawings, as the threshold of the brake operation speed based on which a control signal for clutch disengagement is issued to the clutch actuator 9, two types of thresholds: the threshold (the second threshold B) in high-speed driving and the threshold (the third threshold C) in low-speed driving are set.

Moreover, these thresholds (the second threshold B and the third threshold C) are configured so as to be switched based on the vehicle speed.

In addition, during low-speed driving such as driving in a traffic congestion, as the threshold of the brake operation speed based on which a control signal that disengages a clutch is issued to a clutch operation device, the third threshold (C: for example, the rate of deceleration 10%/sec) set at a slow value is used.

Therefore, when the brake operation speed becomes slow in a traffic congestion, for example, a determination that the brake operation speed is less than the threshold is prevented from being made when the brake is operated to stop the vehicle. Thus, the clutch is disengaged reliably, which prevents a so-called "feeling that the vehicle is pushed out"

from being produced and prevents a shock caused when the vehicle is stopped in a state in which the clutch is engaged.

On the other hand, during ordinary driving, the second threshold (B: for example, the rate of deceleration 30%/sec), for example, is used, and, by setting the second threshold (B) relatively high, the clutch is prevented from being brought into a "disengagement" state as a result of a determination that the brake operation speed is too high being made.

As a result, the vehicle is reliably prevented from running at idle.

Next, a second embodiment will be described with reference to FIG. 5.

The second embodiment of FIG. 5 (the whole of a clutch disengagement mechanism is identified with reference character 100A) is an embodiment obtained by adding a vehicle speed measurement device (hereinafter referred to as a "vehicle speed sensor") 4 to the first embodiment having the configuration of FIG. 1.

Figure 5:
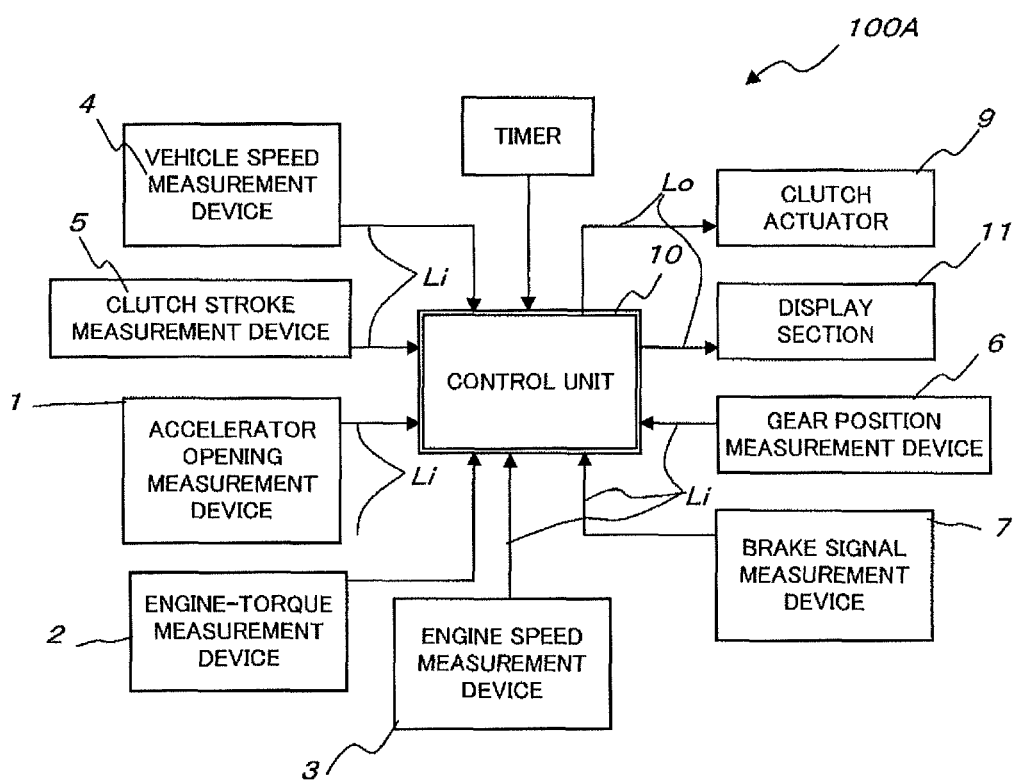
FIG. 5 is a block diagram illustrating the configuration of a control system of a second embodiment.

The second embodiment of FIG. 5 can directly obtain the vehicle speed by the vehicle speed sensor 4. Therefore, in the second embodiment of FIG. 5, control for a computation of the vehicle speed as illustrated in FIG. 3 is not needed.

Except for the above difference in the configuration, the second embodiment of FIG. 5 is substantially the same as the first embodiment and the operations and effects of the second embodiment are also the same as those of the first embodiment.

Next, a third embodiment will be described with reference to FIGS. 6 and 7.

The third embodiment of FIGS. 6 and 7 (the whole of a clutch disengagement mechanism is identified with reference character 100B) is obtained by adding a brake stroke measurement device (hereinafter referred to as a "brake stroke sensor") 8 to the first embodiment of FIGS. 1 to 4.

As a result of the brake stroke sensor 8 being added, a method for obtaining the brake speed by performing a computation in the third embodiment differs from the method for obtaining the brake speed by performing a computation in the first embodiment.

The method of the third embodiment for obtaining the brake speed by performing a computation will be described based on a flowchart of FIG. 7.

Figure 7:
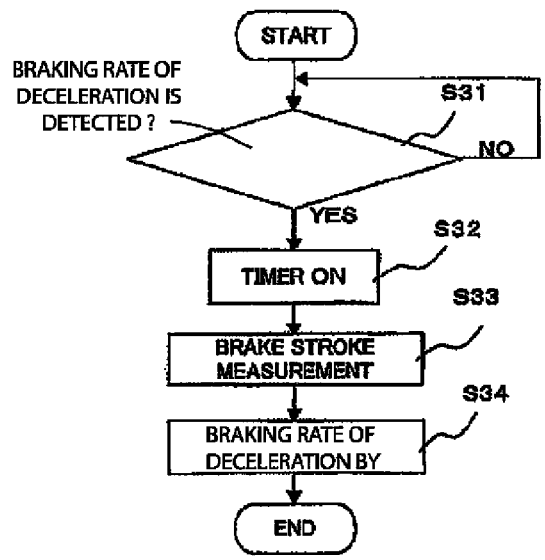
FIG. 7 is a flowchart describing sub control used in the third embodiment.

In step S31 of FIG. 7, the control unit 10 waits until a brake signal is detected while monitoring a signal from the brake sensor 7 (a loop created when step S31 is NO), and, when the brake signal is detected (step S31 is YES), the control unit 10 immediately operates the timer 12 (step S32).

In step S33, the control unit 10 measures the brake stroke by the brake stroke sensor 8, proceeds to step S34, and obtains the brake operation speed by performing a computation by dividing the brake stroke obtained in step S33 by the elapsed time required for the pedal to be fully stepped on (the time that elapses before the step-on amount reaches the maximum amount after the pedal begins to be stepped on: this time can be known by a known technique).

Figure 6:
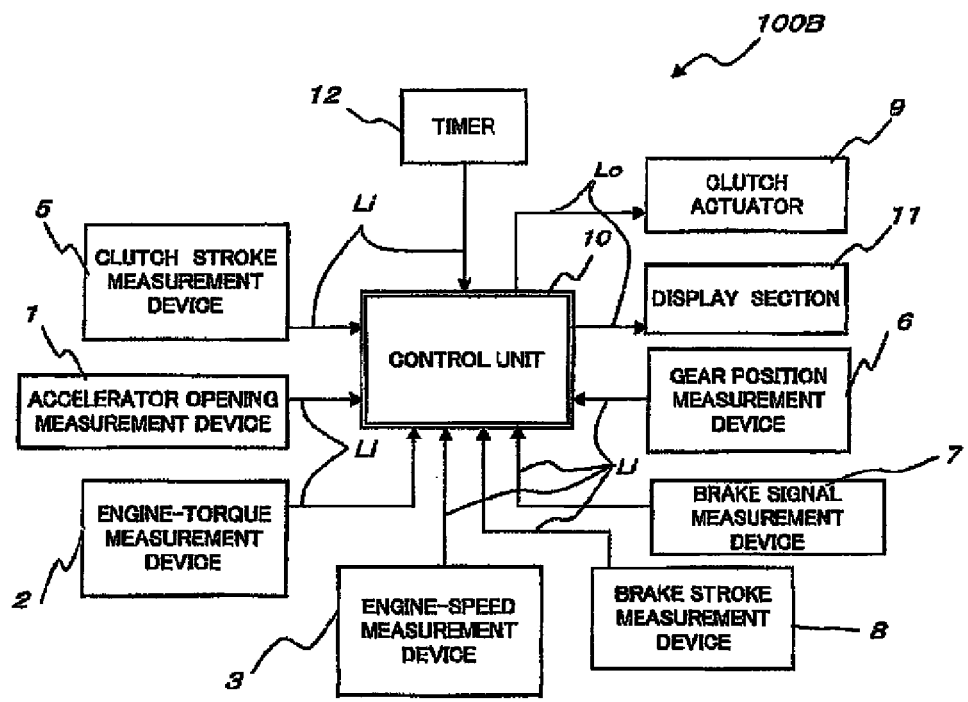
FIG. 6 is a block diagram illustrating the configuration of a control system of a third embodiment.

In other words, in the third embodiment of FIGS. 6 and 7, a brake-operation-speed measurement device is formed of the brake stroke sensor 8, the timer 12, and the control unit 10.

Except for the above difference in the configuration, the third embodiment of FIGS. 6 and 7 is substantially the same as the first embodiment and the operations and effects of the third embodiment are also the same as those of the first embodiment.

Moreover, it is also possible to combine the second embodiment and the third embodiment. The operations and effects in that case is also the same as those of the first embodiment.

The embodiments illustrated in the drawings are mere examples and do not limit the technical scope of the present invention.

REFERENCE SIGNS LIST

1 Accelerator opening measurement device/accelerator opening sensor
3 Engine-speed measurement device/sensor engine rotation sensor
4 Vehicle speed measurement device/vehicle speed sensor
5 Clutch stroke measurement device/clutch stroke sensor
6 Gear position measurement device/gear position measurement sensor
7 Brake signal measurement device/brake sensor
8 Brake stroke measurement device/brake stroke sensor
10 Control device/control unit

The invention claimed is:

1. A clutch disengagement control mechanism for a mechanical automatic transmission, comprising:
a vehicle speed measurement device that measures a vehicle speed;
a braking rate of deceleration measurement device that measures a braking rate of deceleration, the braking rate of deceleration being measured by % per second;
a clutch operation device that performs a clutch disengagement operation; and
a control device, operably coupled to the vehicle speed measurement device and the braking rate of deceleration measurement device,
wherein the control device, which receives data from an engine-torque measurement device and a clutch stroke measurement device, calculates and compares the vehicle speed and the braking rate of deceleration being measured by % per second, wherein when the vehicle speed is more than or equal to a first threshold, the control device issues to the clutch operation device, a control signal that disengages a clutch when the braking rate of deceleration being measured by % per second is more than or equal to a second threshold, and wherein, when the vehicle speed is less than the first threshold, the control device issues to the clutch operation device, a control signal that disengages the clutch when the braking rate of deceleration being measured by % per second is more than or equal to a third threshold,
wherein the second threshold of the brake operation speed is a threshold in high-speed driving and the third threshold of the brake operation speed is a threshold in low-speed driving, and
wherein the second threshold of the braking rate of deceleration being measured by % per second is a value more than the third threshold.

2. The clutch disengagement control mechanism for a mechanical automatic transmission according to claim 1,
said vehicle speed measurement device including an engine-speed measurement device that detects an engine speed of the vehicle, a gear position measurement device that detects a gear position in a transmission, and said control device, and
said control device having a function of determining the vehicle speed based on the gear position in the transmission, the gear position being detected by the gear position measurement device, and the engine speed of the vehicle, the engine speed being detected by the engine-speed measurement device.

3. A clutch disengagement control mechanism for a mechanical automatic transmission, comprising:
a vehicle speed measurement device that measures a vehicle speed;
braking rate of deceleration measurement device that measures a braking rate of deceleration, the braking rate of deceleration being measured by % per second;
a clutch operation device that performs a clutch disengagement operation; and
a control device, operably coupled to the vehicle speed measurement device and the braking rate of deceleration measurement device,
wherein the control device, which receives data from an engine-torque measurement device and a clutch stroke measurement device, calculates and compares the vehicle speed and the braking rate of deceleration being measured by % per second, wherein, when the vehicle speed is more than or equal to a first threshold, the control device issues to the clutch operation device, a control signal that disengages a clutch when the braking rate of deceleration being measured by % per second is more than or equal to a second threshold, and wherein, when the vehicle speed is less than the first threshold, the control device issues to the clutch operation device, a control signal that disengages the clutch when the braking rate of deceleration being measured by % per second is more than or equal to a third threshold,
wherein the second threshold of the brake operation speed is a threshold in high-speed driving and the third threshold of the brake operation speed is a threshold in low-speed driving, and
wherein the second threshold of the braking rate of deceleration being measured by % per second is a value more than the third threshold,
said vehicle speed measurement device including an engine-speed measurement device that detects an engine speed of the vehicle, a gear position measurement device that detects a gear position in a transmission, and said control device, and
said control device having a function of determining the vehicle speed based on the gear position in the transmission, the gear position being detected by the gear position measurement device, and the engine speed of the vehicle, the engine speed being detected by the engine-speed measurement device,
said braking rate of deceleration measurement device including a brake signal measurement device that detects the presence or absence of a brake signal, said control device, and a timer device provided therein, wherein the timer measures a length of time that has elapsed since the detection of the brake signal by the brake signal measurement device, and
said control device has a function of determining the braking rate of deceleration based on said vehicle speed determined by the control device and the length of time that has elapsed since the detection of the brake signal by the brake signal measurement device.

4. A clutch disengagement control mechanism for a mechanical automatic transmission, comprising:
a vehicle speed measurement device that measures a vehicle speed;

braking rate of deceleration measurement device that measures a braking rate of deceleration, the braking rate of deceleration being measured by % per second;

a clutch operation device that performs a clutch disengagement operation; and a control device, operably coupled to the vehicle speed measurement device and the braking rate of deceleration measurement device, wherein the control device, which receives data from an engine-torque measurement device and a clutch stroke measurement device, calculates and compares the vehicle speed and the braking rate of deceleration being measured by % per second, wherein, when the vehicle speed is more than or equal to a first threshold, the control device issues to the clutch operation device, a control signal that disengages a clutch when the braking rate of deceleration being measured by % per second is more than or equal to a second threshold, and wherein, when the vehicle speed is less than the first threshold, the control device issues to the clutch operation device, a control signal that disengages the clutch when the braking rate of deceleration being measured by % per second is more than or equal to a third threshold, wherein the second threshold of the brake operation speed is a threshold in high-speed driving and the third threshold of the brake operation speed is a threshold in low-speed driving, and wherein the second threshold of the braking rate of deceleration being measured by % per second is a value more than the third threshold, said vehicle speed measurement device including an engine-speed measurement device that detects an engine speed of the vehicle, a gear position measurement device that detects a gear position in a transmission, and said control device, and said control device having a function of determining the vehicle speed based on the gear position in the transmission, the gear position being detected by the gear position measurement device, and the engine speed of the vehicle, the engine speed being detected by the engine-speed measurement device, said vehicle speed measurement device being formed of a vehicle speed sensor, said braking rate of deceleration measurement device including a brake signal measurement device that detects the presence or absence of a brake signal, said control device, and a timer device provided therein, wherein the timer measures a length of time that has elapsed since the detection of the brake signal by the brake signal measurement device, and said control device having a function of determining the braking rate of deceleration based on the vehicle speed measured by the vehicle speed sensor and the length of time that has elapsed since the detection of the brake signal by the brake signal measurement device.

* * * * *